United States Patent [19]
Gaskill et al.

[11] Patent Number: 5,682,148
[45] Date of Patent: *Oct. 28, 1997

[54] PAGING SYSTEM WITH MESSAGE NUMBERING PRIOR TO TRANSMISSION

[75] Inventors: Garold B. Gaskill, Tualatin; Daniel J. Park, Portland, both of Oreg.

[73] Assignees: Seiko Corporation; Seiko Epson Corp., both of Japan

[*] Notice: The term of this patent shall not extend beyond the expiration date of Pat. No. 4,713,808.

[21] Appl. No.: 420,617

[22] Filed: Apr. 12, 1995

Related U.S. Application Data

[63] Continuation of Ser. No. 134,518, Oct. 8, 1993, abandoned, which is a continuation of Ser. No. 867,295, Apr. 10, 1992, abandoned, which is a continuation of Ser. No. 435,315, Nov. 13, 1989, abandoned, which is a continuation-in-part of Ser. No. 352,635, May 12, 1989, Pat. No. 4,897,835, which is a continuation of Ser. No. 121,139, Nov. 16, 1987, abandoned, which is a continuation-in-part of Ser. No. 802,844, Nov. 27, 1985, Pat. No. 4,713,808.

[51] Int. Cl.⁶ .................................................. G08B 5/22
[52] U.S. Cl. .......................... 340/825.44; 340/825.2; 371/32; 371/69.1
[58] Field of Search .................... 340/825.44, 825.2, 340/825.21; 455/32.1, 38.1; 370/60, 61, 394; 371/32, 33, 67.1, 69.1; 379/60, 61

[56] References Cited

U.S. PATENT DOCUMENTS

| | | | |
|---|---|---|---|
| 3,532,985 | 10/1970 | Glomb et al. | 325/4 |
| 3,628,147 | 12/1971 | Makino | 325/4 |
| 3,836,726 | 9/1974 | Wells et al. | 179/41 A |
| 3,937,004 | 2/1976 | Natori et al. | 58/152 B |
| 4,131,855 | 12/1978 | Hamagawa | 328/129 |
| 4,315,332 | 2/1982 | Sakami et al. | 455/181 |
| 4,317,220 | 2/1982 | Martin | 455/58 |
| 4,337,463 | 6/1982 | Vangen | 340/825.3 |
| 4,358,836 | 11/1982 | Tohyama et al. | 368/47 |
| 4,369,443 | 1/1983 | Giallanza et al. | 340/825.47 |
| 4,383,257 | 5/1983 | Giallanza et al. | 340/825.47 |
| 4,385,295 | 5/1983 | Willard et al. | 340/825.44 |
| 4,398,192 | 8/1983 | Moore et al. | 340/825.44 |
| 4,410,889 | 10/1983 | Bryant et al. | 340/825.2 |
| 4,412,217 | 10/1983 | Willard et al. | 340/825.44 |
| 4,419,765 | 12/1983 | Wycoff et al. | 455/36 |
| 4,422,171 | 12/1983 | Wortley et al. | 371/32 |
| 4,427,980 | 1/1984 | Fennell et al. | 340/825.52 |
| 4,432,090 | 2/1984 | da Silva | 371/32 |
| 4,437,095 | 3/1984 | Akahori et al. | 340/825.44 |
| 4,439,859 | 3/1984 | Donnan | 371/32 |
| 4,477,807 | 10/1984 | Nakajima et al. | 340/825.48 |
| 4,507,782 | 3/1985 | Kunimasa et al. | 371/32 |
| 4,518,961 | 5/1985 | Davis et al. | 340/825.44 |
| 4,519,068 | 5/1985 | Krebs et al. | 370/82 |
| 4,551,834 | 11/1985 | Lienard | 371/32 |
| 4,567,518 | 1/1986 | Driessen | 358/133 |
| 4,569,598 | 2/1986 | Jacobs | 368/47 |
| 4,641,304 | 2/1987 | Raychaudhuri | 370/95 |
| 4,644,347 | 2/1987 | Lucas et al. | 340/825.04 |
| 4,682,148 | 7/1987 | Ichikawa et al. | 340/311.1 |
| 4,682,165 | 7/1987 | Davis | 340/825.44 |
| 4,688,034 | 8/1987 | de Graaf | 340/825.48 |
| 4,688,035 | 8/1987 | Gray et al. | 340/825.44 |
| 4,698,805 | 10/1987 | Sasuta et al. | 370/97 |
| 4,704,608 | 11/1987 | Sato et al. | 340/825.44 |
| 4,712,215 | 12/1987 | Joshi et al. | 371/37 |
| 4,713,808 | 12/1987 | Gaskill et al. | 340/825.44 |

(List continued on next page.)

*Primary Examiner*—Jeffery Hofsass
*Assistant Examiner*—Andrew Hill
*Attorney, Agent, or Firm*—Elmer Galbi

[57] ABSTRACT

A paging system repeatedly broadcast each message and associates a sequential message number with each paging message. The message number in each message serves two functions. First, the message number is used to determine if the same message was previously received and second, when a subscriber reviews the messages, missing messages can be readily detected by skipped message numbers. All messages that are transmitted are also stored at a clearinghouse and a subscriber can telephone the clearinghouse facility and request that particular missed messages be retransmitted or given by voice response over the telephone.

3 Claims, 3 Drawing Sheets

U.S. PATENT DOCUMENTS

| | | | |
|---|---|---|---|
| 4,742,517 | 5/1988 | Takagi et al. | 371/2 |
| 4,758,834 | 7/1988 | Sato et al. | 340/825.47 |
| 4,759,022 | 7/1988 | Akerberg | 371/69.1 |
| 4,786,902 | 11/1988 | Davis et al. | 340/825.44 |
| 4,803,487 | 2/1989 | Willard et al. | 340/825.44 |
| 4,839,641 | 6/1989 | Mori et al. | 340/825.47 |
| 4,975,952 | 12/1990 | Mabey et al. | 340/825.34 |
| 5,159,331 | 10/1992 | Park et al. | 340/825.44 |
| 5,185,604 | 2/1993 | Nepple et al. | 340/825.44 |

PAGING SYSTEM WITH MESSAGE NUMBERING PRIOR TO TRANSMISSION

This application is a continuation of application Ser. No. 08/134,518, filed Oct. 8, 1993, now abandoned, which was a continuation of application Ser. No. 07/867,295, filed Apr. 10, 1992, now abandoned, which was a continuation of application Ser. No. 07/435,315, filed Nov. 13, 1989, now abandoned, which was a continuation-in-part of application Ser. No. 07/352,635, filed May 12, 1989, now U.S. Pat. No. 4,897,835, which was a continuation of application Ser. No. 07/121,139, filed Nov. 16, 1987, now abandoned, which was a continuation-in-part of application Ser. No. 06/802,844, filed Nov. 27, 1985, now U.S. Pat. No. 4,713,808. All of these related cases are assigned to the present assignee and are incorporated herein by reference.

FIELD OF THE INVENTION

The present invention relates to paging systems, and more particularly the present invention relates to a paging systems wherein each message is transmitted a number of times.

BACKGROUND OF THE INVENTION

In conventional paging systems, each paging receiver is assigned a unique address. Whenever a paging message is transmitted, the system transmits the message in association with the address of the particular paging receiver for which the message is intended. Each paging receiver in the system only accepts messages which include its address.

It is desirable that paging receivers provide very high reliability; however, environmental factors sometimes interfere with message reception and sometimes messages are lost. It has been suggested that it would be desirable if each message were numbered so that someone receiving messages could determine if a message had been missed. This is suggested in a report by the Post Office Code Standardisation Advisory Group (POCSAG) entitled "Standard Message Formats for Digital RadioPaging" Autumn 1980. Message numbering was not made a part of the POCSAG standard which is discussed in this report. The group which prepared this report merely indicated that "message or segment numbering is recommended as a feature for paging system operators to offer as a useful option". They indicate that numbers in "the cyclically rotating range 1-9 would be sufficient". This report does not recognize the fact that as a practical matter, in a binary system binary numbers of 8, 16, or 32 are the most efficient use of space. The choice of the numbers with a range of 1 to 9 indicates that the authors had not conceived of a practical implementation of the suggested system.

Some prior art paging receivers which use the POCSAG protocol described in the above referenced report do include facilities for numbering messages. For example see U.S. Pat. Nos. 4,385,295, 4,412,217 and 4,803,487. These receivers include memory means for storing messages and each incoming message is assigned a message number, which is then stored in the receiver's memory in association with the message. When the message is later retrieved for viewing, the message number is also displayed, aiding the subscriber in keeping track of which messages have been reviewed.

U.S. Pat. No. 4,803,487 shows a different system which uses message numbering. In the system shown in this reference the display portion of the pager unit is separated from the receiver portion. The display portion is worn on the subscriber's wrist. The receiver portion is carried elsewhere on the subscriber's person apparently because the receiver is too large to be worn on the receivers wrist. The receiver portion of this system includes the message memory and includes a low power transmitter for relaying the messages from the receiver portion to the display portion for display. The receiver assigns numbers and when information is sent to the apparatus on the subscribes wrist the message number is also transmitted.

The system described in the above referenced copending applications achieves a high degree of reliability by transmitting each message several times. In such a system, message numbering is used in a novel way to achieve synergistic results with the other parts of the system.

SUMMARY OF THE INVENTION

According to the present invention, a sequential message number is associated with each paging message. Unlike the prior art described above, in which the message numbers are assigned on receipt of the messages, the present invention assigns the numbers on message origination, at the system's central clearinghouse facility. With the present invention, message numbers are used for two purposes. First, in the system of the present invention in order to enhance reliability, each message is routinely transmitted several times. The message number is used to tell a receiver that it should ignore a message if it previously received a message with the same message number. Second, the message number which is received with a message is stored and displayed with the message, missing messages can be readily detected by skipped message numbers. The subscriber can then telephone the clearinghouse facility and request, by Touch-Tone command, that the message(s) corresponding to the missing message number(s) be retransmitted.

The foregoing and additional features and advantages of the present invention will be more readily apparent from the following detailed description thereof, which proceeds with reference to the accompanying drawings.

BRIEF DESCRIPTION OF THE DRAWINGS

FIG. 4 is identical (except reference numerals) to FIG. 5C in allowed application Ser. No. 07/352,635 and in issued U.S. Pat. No. 4,713,808.

DETAILED DESCRIPTION OF THE INVENTION

For expository convenience, the present invention will be illustrated with reference to a paging system (the "Gaskill" system) described in U.S. Pat. No. 4,713,808 and in allowed application Ser. No. 07/352,635. However, it will be recognized that the invention is not so limited.

Figure 1:
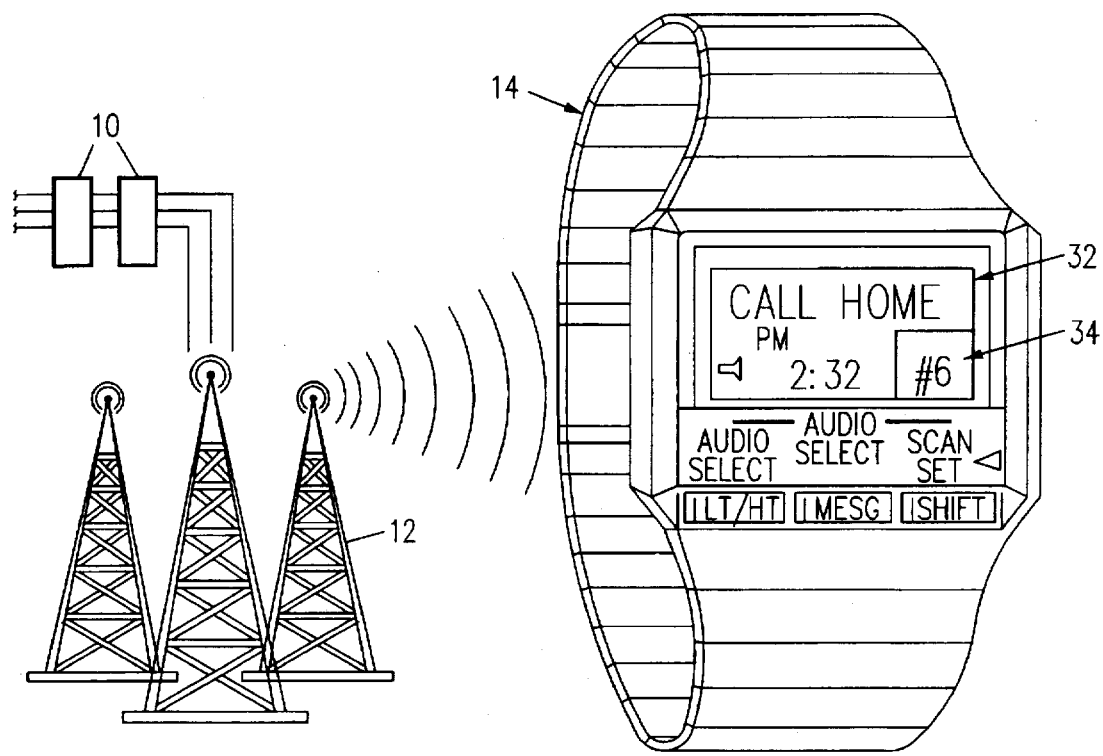
FIG. 1 is a schematic block diagram illustrating a paging system that may use the present invention.

As shown in FIG. 1, the Gaskill system includes clearinghouses 10, broadcasting facilities 12 and wristwatch paging receivers 14. The clearinghouses 10 are fully automated centralized facilities which accept messages, validate subscriber identification, determine message destinations and route messages to the appropriate broadcast facilities for transmission. Callers to the system dial a local clearinghouse telephone number and hear voice prompts that guide them through a simple process for sending messages.

The broadcast facilities 12 are typically conventional FM broadcast stations that carry paging data on subcarriers of their signals. Multiple stations are used for transmission in a given area. Diversity of signals combined with repeated transmission improve system reliability. Since messages are transmitted several times on each station and each message can also be transmitted on several different stations, it is essential that a receiver have a means of identifying if the same message was previously received. The message number provides this mechanism.

Figure 2:
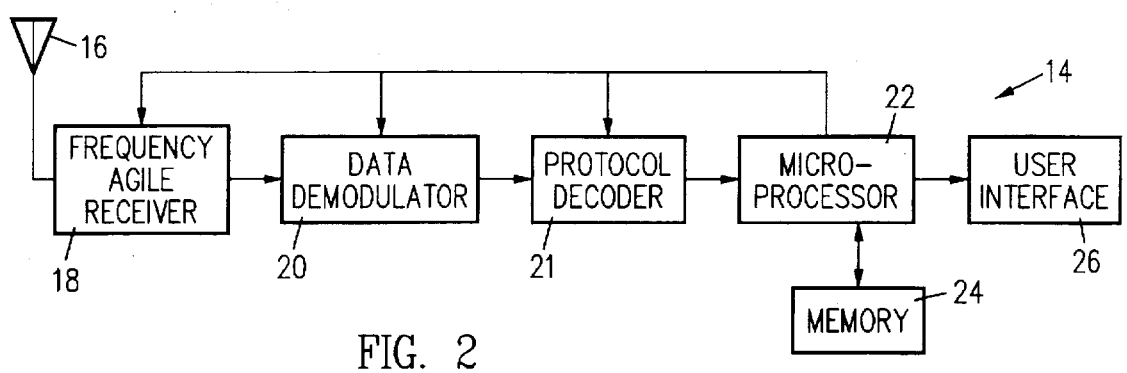
FIG. 2 is a schematic block diagram illustrating a wristwatch paging receiver used in the system of FIG. 1.
Figure 3:
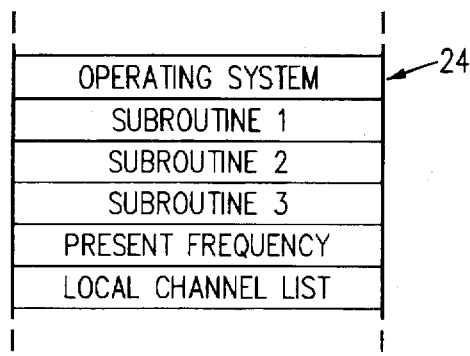
FIG. 3 is a block diagram illustrating the partial contents of a microprocessor memory used in the paging receiver of FIG. 2.

The wristwatch paging receivers 14 are worn by the subscribers and receive the paging messages broadcast by the broadcast facilities. A block diagram of such a receiver is shown in FIG. 2. The receiver basically includes an antenna 16, a frequency agile receiver 18, a data demodulator 20, a protocol decoder 21, a microprocessor 22 (with associated memory 24) and a user interface 26. Memory 24 contains various data and programs relating to operation of the watch, such as a subroutine for finding a new station, a subroutine for obtaining a local channel list, s subroutine for detecting missing messages (described below), a datum indicative of the frequency to which the watch is presently tuned, and a local channel list. FIG. 3 illustrates some of the contents of this memory 24.

To review operation of the receiver 14 briefly, antenna 16 receives radio frequency signals in the desired reception band (here 88 to 108 MHz) and couples them to the frequency agile receiver 18. The frequency agile receiver 18 processes the RF signals from the antenna and produces baseband output signals corresponding to a desired FM station within the reception band—typically an FM signal carrying the paging data on an SCA subcarrier thereof. This SCA paging data is detected by the data demodulator 20, decoded by the protocol decoder 21 and is provided to the microprocessor 22 for processing. The microprocessor 22 drives the user interface 26 to alert the user of paging messages.

Figure 4:
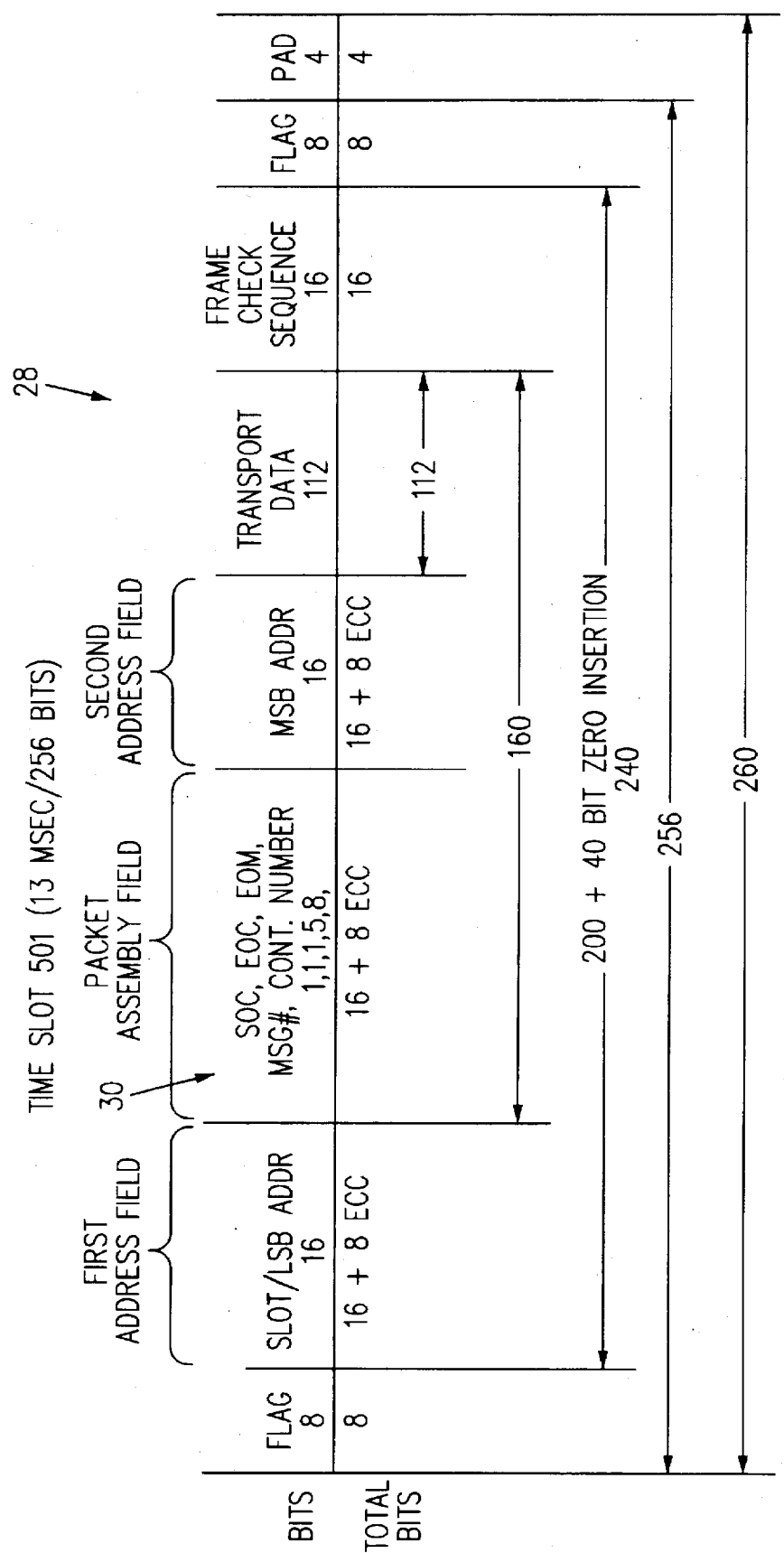
FIG. 4 is a diagram illustrating the format used in one embodiment of the present invention to transmit messages from the paging system to paging receivers.

FIG. 4 illustrates the format of a single message time slot 28 used in broadcasting messages to the paging receiver 14. (The transmission format is discussed in detail in the earlier-referenced parent cases.) As indicated, the packet assembly field 30 of the illustrated time slot includes a five bit message number. These five bits represent a modulo 32 count of the number of messages sent to a particular receiver. In the illustrated embodiment, each message is numbered, and the next message is assigned the previous message number plus 1.

When the receiver 14 of FIG. 2 receives a message, the message is stored in association with the message number in the memory 24. When the messages are subsequently recalled to the display 32 (by a subroutine stored in memory 24 and executed by the microprocessor 22), the corresponding message numbers 34 are also displayed. If, in reviewing messages, a subscriber finds messages 1,2 and 4, but no reference to message 3, the subscriber can telephone the paging system clearinghouse 10 and request, by Touch-Tone commands, that message number 3 be retransmitted.

Figure 5:
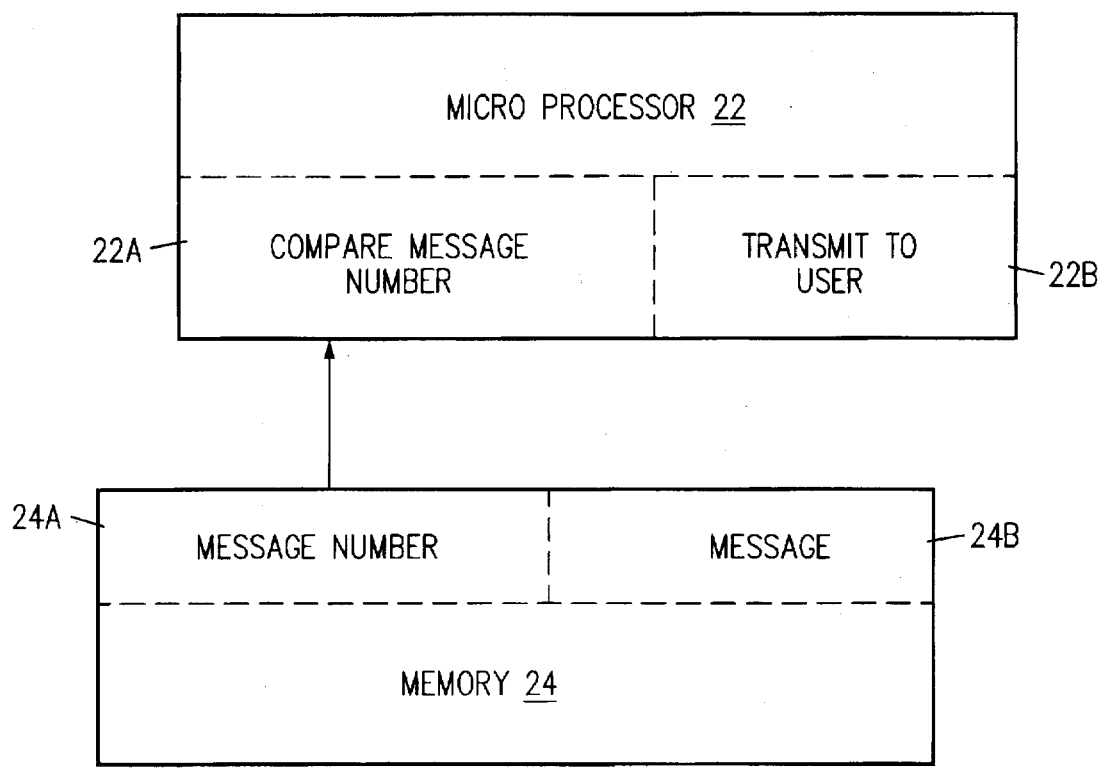
FIG. 5 is a diagram showing the subroutines used in the microprocessor to determine if a message is identical to a previously received message.

FIG. 5 shows the subroutine 22A in microprocessor 22 which compares the number of each message which is received to the number 24A of the messages stored in memory 24. Messages are only transmitted to the user interface 26 by subroutine 22B if they have an associated message number that is different from the message number of the messages stored in memory 24. Naturally if a large number of messages are missed there could be a misinterpretation of the cyclically repeating message number. However, a message number of four bits gives a count of thirty two and it is highly unlikely that a receiver will miss thirty two messages.

Figure 6:
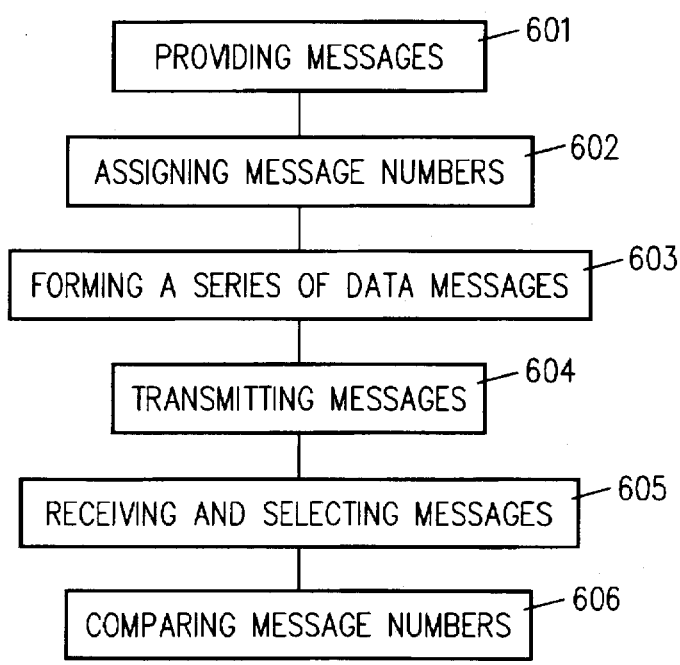
FIG. 6 is a flow diagram illustrating the operation of the invention.

FIG. 6 is a flow diagram showing the sequence of steps that occur during the operation of the applicant's invention. The steps include the step shown by block 601, namely providing a series of messages. Next as shown by block 602, sequential messages numbers are assigned to the messages. For example, the first message is assigned the number "one" and the second message is assigned number "two", etc. As shown by block 603, a series of messages is next formed and then transmitted (block 604). The receivers receive messages and then select those with the appropriate addresses as shown by block 605. Duplicate and missed messages are next detected as indicated by block 606 by comparing message numbers.

If desired, the microprocessor 22 can automatically execute a message number checking subroutine stored in memory 24 each time a message is received. This subroutine compares the message number of each newly received message with the message number of the previously received message to confirm that the new message is the next in the numbered sequence. If it is not, the microprocessor can inform the subscriber, either by an audible signal or by an annunciator displayed on the display 32.

Having described and illustrated the principles of our invention with reference to a preferred embodiment thereof, it will be apparent that the invention can be modified in arrangement and detail without departing from such principles. For example, while the invention has been illustrated with reference to an embodiment in which the message numbers are sequentially assigned numbers, in other embodiments the message numbers may be elements of any data series from which a missing datum can be detected.

In view of the variety of embodiments to which the principles of our invention may be applied, it should be recognized that the detailed embodiment is illustrative only and should not be taken as limiting the scope of our invention. Rather, we claim as our invention all such embodiments as may come within the scope and spirit of the following claims and equivalents thereto.

We claim:

1. In a paging system which selectively transmits paging messages from a central transmitter to a plurality of addressable paging receivers, means located at said central transmitter for assigning sequential numbers to the messages addressed to each of said plurality of addressable paging receivers and for transmitting with each message the number assigned thereto, and means at each receiver for receiving messages and the numbers assigned thereto and for displaying the assigned numbers of the messages which have been received, whereby if a message is transmitted and not received a gap will exist in the sequence of numbers displayed.

2. The system recited in claim 1 including means at said receivers to compare message numbers with previously received message numbers, whereby duplicate messages can be detected.

3. In a paging system which selectively transmits paging messages from a central transmitter to an addressable paging receiver, means located at said central transmitter for assigning sequential message numbers to the messages addressed to said addressable paging receiver and for transmitting with each message the assigned message number, means at said addressable paging receiver for receiving messages addressed thereto and for receiving the message number of each received message, and means at said addressable paging receiver for comparing the received message numbers with previously received message numbers and for displaying received message numbers whereby duplicate messages can be detected and if a message is transmitted and not received a gap will exist in the sequence of message numbers displayed.

* * * * *